United States Patent
Maltaverne et al.

(10) Patent No.: US 8,499,596 B2
(45) Date of Patent: Aug. 6, 2013

(54) ANTITHEFT DEVICE FOR THE STEERING COLUMN OF A VEHICLE HAVING SUPERLOCKOUT PROVIDED BY AN INTERMEDIATE ROCKER BAR

(75) Inventors: Frédéric Maltaverne, Créteil Cedex (FR); Christophe Perrin, Creteil Cedex (FR)

(73) Assignee: Valeo Securite Habitacle, Creteil (FR)

( * ) Notice: Subject to any disclaimer, the term of this patent is extended or adjusted under 35 U.S.C. 154(b) by 0 days.

(21) Appl. No.: 13/496,922

(22) PCT Filed: Oct. 20, 2010

(86) PCT No.: PCT/EP2010/065821
§ 371 (c)(1),
(2), (4) Date: Apr. 13, 2012

(87) PCT Pub. No.: WO2011/054673
PCT Pub. Date: May 12, 2011

(65) Prior Publication Data
US 2012/0186311 A1    Jul. 26, 2012

(30) Foreign Application Priority Data
Nov. 6, 2009   (FR) ..................................... 09 05363

(51) Int. Cl.
*B60R 25/02*   (2013.01)
(52) U.S. Cl.
USPC .................................. 70/186; 70/237; 70/252
(58) Field of Classification Search
USPC ..................... 70/182–186, 237, 252
See application file for complete search history.

(56) References Cited

U.S. PATENT DOCUMENTS

| | | | | |
|---|---|---|---|---|
| 3,650,131 A | * | 3/1972 | Eichenauer | 70/252 |
| 3,877,265 A | * | 4/1975 | Schaumberg | 70/252 |
| 4,776,189 A | * | 10/1988 | Weber et al. | 70/182 |
| 5,271,252 A | * | 12/1993 | Yasuhara et al. | 70/186 |
| 5,570,599 A | * | 11/1996 | Konii | 70/186 |
| 5,632,167 A | * | 5/1997 | Kawachi et al. | 70/186 |
| 6,076,382 A | * | 6/2000 | Naganuma | 70/186 |
| 6,295,848 B1 | * | 10/2001 | Suzuki | 70/186 |
| 6,327,882 B1 | * | 12/2001 | Canard | 70/186 |
| 6,354,118 B1 | * | 3/2002 | Frick et al. | 70/186 |
| 6,439,011 B1 | * | 8/2002 | Frick et al. | 70/185 |
| 6,516,640 B2 | * | 2/2003 | Jacobs et al. | 70/186 |
| 6,647,751 B2 | * | 11/2003 | Zillmann | 70/186 |

(Continued)

FOREIGN PATENT DOCUMENTS

| | | |
|---|---|---|
| FR | 2366426 A1 | 4/1978 |
| FR | 2679504 A1 | 1/1993 |
| WO | 2008/074726 A1 | 6/2008 |

OTHER PUBLICATIONS

International Search Report issued in PCT/EP2010/065821, mailed Nov. 22, 2010, with translation, 4 pages.

*Primary Examiner* — Suzanne Barrett
(74) *Attorney, Agent, or Firm* — Osha • Liang LLP

(57) ABSTRACT

The invention relates to an antitheft device (2) for the steering column of a vehicle, comprising: a locking portion including a bolt for locking the steering column, and a mobile member capable of controlling the locking-in-position of the bolt; and an access portion including a latch, wherein said device includes a rocker arm for converting a movement of the mobile control member into the release of a super-lockout element.

9 Claims, 3 Drawing Sheets

U.S. PATENT DOCUMENTS

| | | | |
|---|---|---|---|
| 6,915,671 B2 * | 7/2005 | Zillmann | 70/186 |
| 6,931,896 B2 * | 8/2005 | Ochi | 70/186 |
| 7,121,126 B2 * | 10/2006 | Zillmann | 70/186 |
| 7,267,018 B2 * | 9/2007 | Kai | 73/865.8 |
| 7,299,669 B1 * | 11/2007 | Chung et al. | 70/252 |
| 7,536,886 B2 * | 5/2009 | Fernandez | 70/186 |
| 7,669,444 B2 * | 3/2010 | Fernandez et al. | 70/185 |
| 7,823,426 B2 * | 11/2010 | Okuno et al. | 70/186 |
| 7,891,221 B2 * | 2/2011 | Sugimoto | 70/186 |
| 8,001,814 B2 * | 8/2011 | Okada et al. | 70/186 |
| 8,033,148 B2 * | 10/2011 | Okada et al. | 70/186 |
| 8,176,760 B2 * | 5/2012 | Chung | 70/252 |
| 2004/0148983 A1 * | 8/2004 | Suzuki et al. | 70/186 |
| 2004/0182121 A1 * | 9/2004 | Fukatsu et al. | 70/186 |
| 2008/0110219 A1 * | 5/2008 | Maltaverne et al. | 70/210 |
| 2009/0064739 A1 * | 3/2009 | Trischberger et al. | 70/237 |
| 2010/0011820 A1 * | 1/2010 | Giacomin | 70/252 |
| 2010/0018265 A1 * | 1/2010 | Kumano | 70/252 |
| 2010/0192646 A1 * | 8/2010 | Nakamoto | 70/237 |
| 2011/0132048 A1 * | 6/2011 | Okada | 70/182 |
| 2011/0296881 A1 * | 12/2011 | Tamezane et al. | 70/252 |

* cited by examiner ic
ANTITHEFT DEVICE FOR THE STEERING COLUMN OF A VEHICLE HAVING SUPERLOCKOUT PROVIDED BY AN INTERMEDIATE ROCKER BAR The invention relates to antitheft devices for the steering column of a vehicle.

Such devices, which generally comprise the vehicle's ignition key lock, have the function of blocking movement of the column when such movement is not authorized, in particular when the vehicle's ignition key is not present.

Furthermore, they frequently have a superlocking function, the purpose of which is to maintain blocking of the column even if a criminal has broken the part of the device with the lock.

Furthermore, these devices must comply with the standards and regulations in force relating to driver knee impact, which require the antitheft device to break under the effect of a predetermined impact with the driver's knee without seriously injuring said driver. This is why the device is generally provided with a fusible zone which allows it to break under the effect of a low load. Under these conditions, the aim is to ensure that breakage takes place without threatening the superlocking function if a criminal exerts a similar load.

In the context of such devices, the aim is to be able to arrange the various elements necessary for the superlocking function in an advantageous arrangement in terms of size, while taking care to ensure that superlocking is triggered reliably.

In fact, this function is triggered by a mobile rod urged by a spring against the part of the device bearing the lock or by direct attachment of the rod to a part bearing the lock.

This rod must extend from a zone close to the lock as far as a zone close to a superlocking pin, and cooperation between the rod and the pin is here deemed to need improvement in this respect.

One object of the invention is to facilitate triggering of the superlocking function whatever the location of the superlocking pin, and in particular when it is disposed on a side of the steering column which is opposite that where the lock is located.

To this end, the invention provides an antitheft device for the steering column of a vehicle, comprising:

a blocking part comprising a bolt for blocking the steering column, and a mobile member capable of controlling blocking in position of the bolt;
and
an access part comprising a lock,
which device comprises a pivoting rocker bar converting displacement of the mobile control member into release of a superlocking element.

The device according to the invention therefore makes it possible to locate the superlocking element, for example a superlocking pin, in a zone a very long way from the lock and thus well protected from attack from outside.

This rocker bar will allow different spatial configurations of a control rod and of a locking pin, and in particular configurations in which:

the superlocking pin is situated on a side of the steering column opposite to the side where the lock is located;
the rocker bar extends in a direction transverse to a direction of displacement of the control member and transverse to a direction of displacement of the superlocking pin.

The device according to the invention may additionally display at least any one of the following features:

the device has a shaft which converts rotation of the lock into a movement initiating displacement of the bolt, which shaft has a lateral notch, and the pivoting rocker bar is disposed so as to pivot into the interior of the notch when it is rocked into the position triggering superlocking, the notch in the shaft which converts rotation of the lock into a movement initiating displacement of the bolt is placed such that the rocker bar can enter the notch only when the shaft is in a position or the lock is in a position in which it controls locking of the steering column, the shaft for converting rotation of the lock into a movement initiating displacement of the bolt is placed such that the bolt and the superlocking pin are situated between the shaft and the steering column.

The crankshaft notch further makes it possible to increase the angular clearance of the rocker bar, to further promote triggering of the superlocking function.

The invention also provides a vehicle comprising a device according to the invention.

Other features and advantages of the invention will become more apparent from the following description of an embodiment and of a variant given by way of non-limiting examples, with reference to the appended drawings in which:

FIGS. 1 to 4 illustrate one embodiment of the antitheft device according to the invention for an automotive steering column.

This device 2 comprises, in the case in point, two main parts which we will here respectively call the access part 4 and the blocking part 6. The access part 4 in particular comprises a key lock or similar device. When the driver of the vehicle introduces the key into the lock, he may set a rotor of the latter turning so as to switch on the vehicle and set it in operation.

Figure 4:
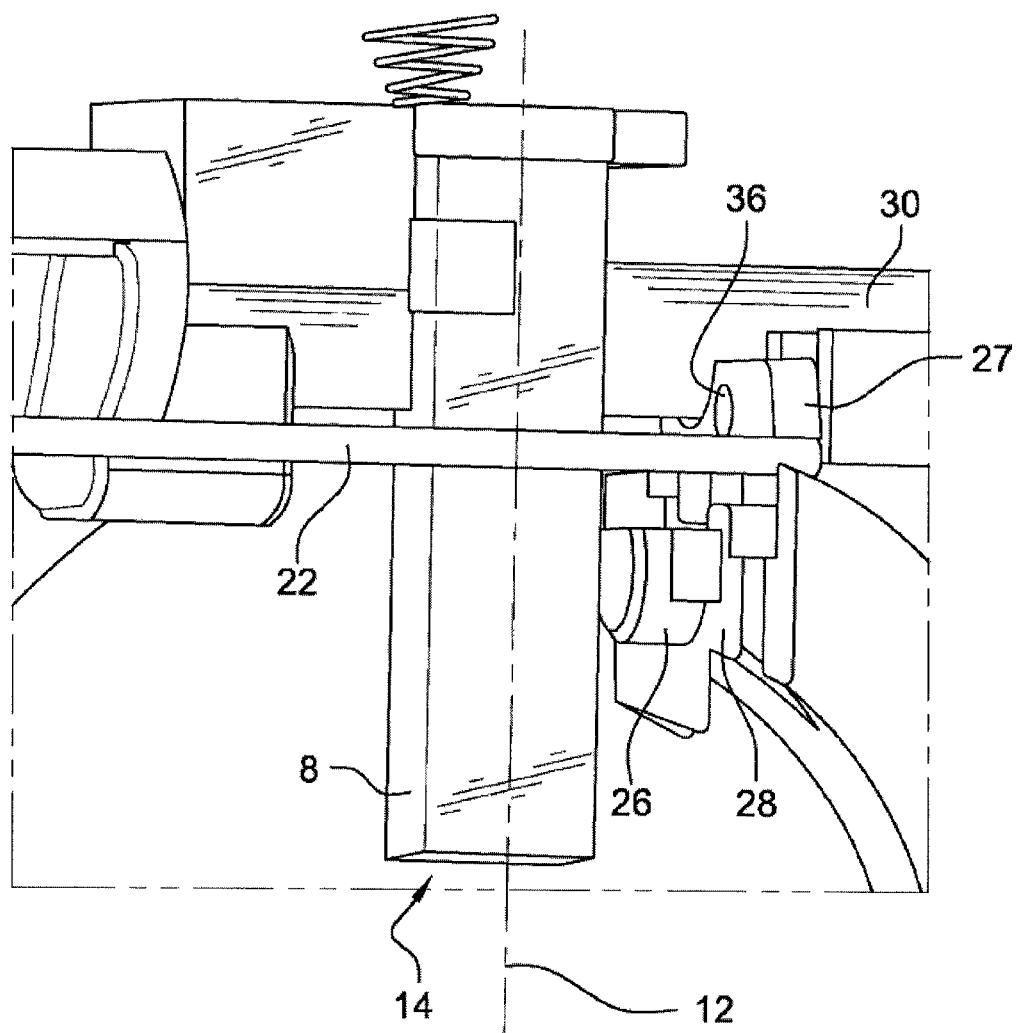
FIG. 4 is a sectional and perspective view of certain parts of this same device.

The blocking part 6 comprises in particular a bolt 8 visible in FIG. 4 and having the general shape of a right parallelepiped. It is mounted so as to slide in a bolt guide 10 of the part 6. Sliding takes place in a longitudinal direction 12 of the bolt. When in the extended position, the bolt, by means of its distal end 14, engages with a vehicle steering column member to block rotation of the latter around its axis of rotation.

Actuating the lock using the key makes it possible to control the position of the bolt and therefore blocking or unblocking of the steering column. For more details in this respect, reference is made in particular to application WO 2008/074726 in the name of the applicant.

The device 2 comprises a housing 16 having, at a junction point between the access part 4 and blocking part 6, a weakened or breaking zone embodied by a local reduction in the thickness of the housing wall 16. This zone is positioned such that, if a load is exerted on the access part 4, it is capable of causing breakage of the housing 16 and of the device by separation of the access part 4 and the blocking part 6.

The blocking part 6 comprises a mobile member 22, in the case in point in the form of a slide such as a gauge rod 22 or needle. The gauge rod 22 assumes the general form of a rigid rectilinear rod extending in the case in point perpendicular to the direction 12. The gauge rod 22 is mounted so as to move in a sliding manner in the housing 16.

The mobile member 22 extends so as to connect the access part to the blocking part such that separation between the access part and the blocking part results in displacement of the mobile member in the blocking part.

The rod 22 is here displaced by the separating movement of the access part. To this end the rod is here fixed by its end to the lock and driven by the latter in this case.

The blocking part comprises a pin 26 mounted in a mobile manner in a channel 28 and held in position at one end of this channel by a retaining arm of a rocker bar 27. The device is arranged such that, if the gauge rod 22 urged by the spring moves towards the access part 4 in the opposite direction from the bolt, it releases an actuating arm of the rocker bar 27, which then pivots and releases the pin 26 by moving its opposite arm, here designated retaining arm, out of the way. The spring-driven pin 26 then blocks the bolt 8 in position, itself immobilizing the steering column.

The rocker bar or lever 27 is mounted so as to pivot relative to the housing 16 about an axis 36. The axis 36 is parallel to the directions of the mobile member 22 and parallel to the direction of displacement of the superlocking pin 26, and transverse to the direction of the steering column.

The rocker bar 27 here extends between the mobile member 22 and the pin 36, resting laterally against each of them, such that moving of the mobile member 22 longitudinally out of the way causes release of the arm of the rocker bar resting thereagainst, and lateral moving of the other arm out of the way relative to the superlocking pin 26.

The rocker bar 27 here rests against the pin 26 at the level of a lateral indentation therein. This lateral indentation has a sloping end, against which the rocker bar 27 comes to rest in the retaining position of the pin 27.

When the rocker bar is released, its retaining arm slides against this slope, releasing the pin. Release of the pin is thus gradual and without extended contact between said two elements. Thanks to this slope, forming an extended obstacle to the retaining arm of the rocker bar but providing only a limited contact surface between pin and rocker bar, any risk of accidental retention of the pin by friction against the rocker bar 27 is eliminated.

The rocker bar retaining arm has a side opposite the side cooperating with the pin 26 a surface in contact with a shaft or crankshaft 30.

Figure 1:
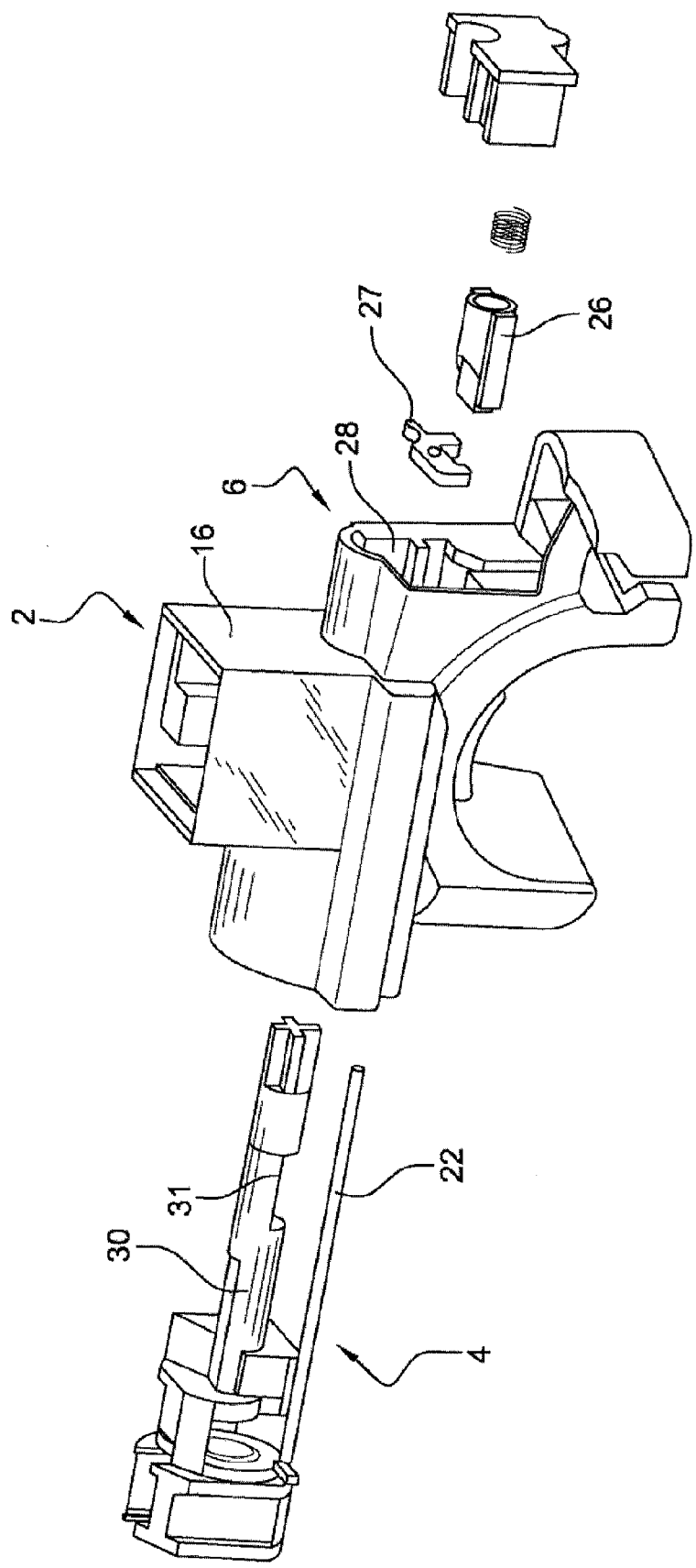
FIG. 1 is a tangential view of the device according to one embodiment of the invention.
Figure 2:
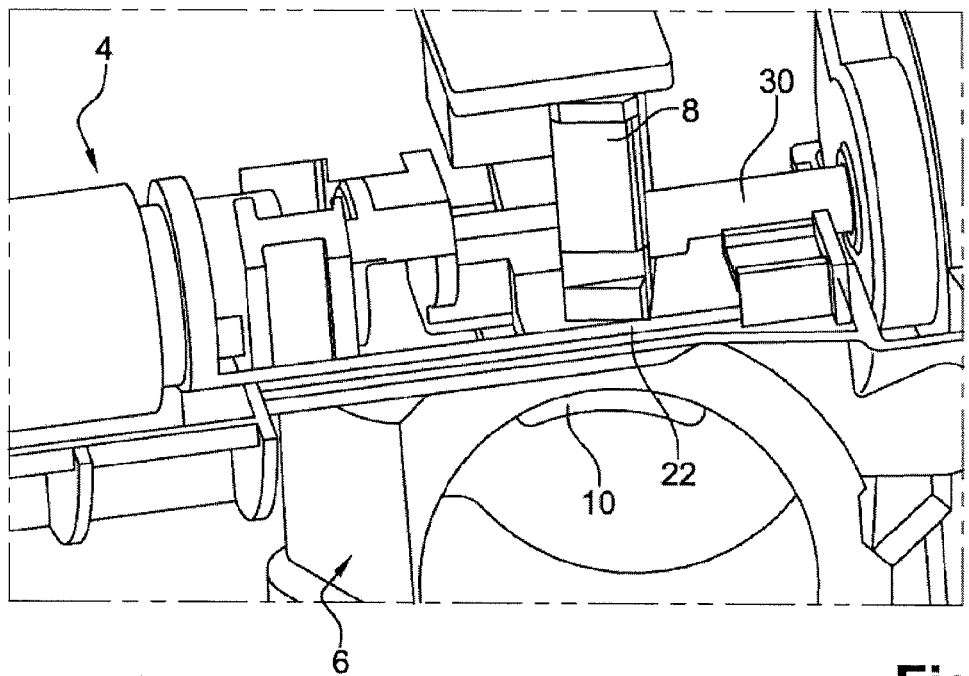
FIG. 2 is a partial view of the device of FIG. 1.
Figure 3:
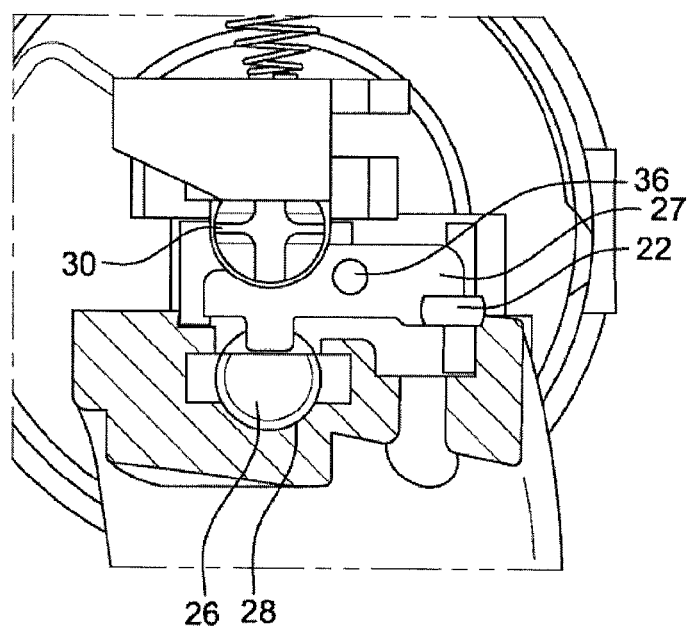
FIG. 3 is a cross-sectional view of the same device.

The crankshaft 30 converts a rotary movement of the lock, shown partially in the left-hand part of FIG. 2, and a movement initiating displacement of the bolt 8. Furthermore, this shaft 30 transmits rotation of the lock to a rotary switch shown on the right in FIG. 2. The shaft 30 is therefore positioned so as to connect for operating reasons two opposite sides of the steering column, covering part of the housing containing the bolt 8 and the superlocking element 26.

The shaft 30 has a notch 31 which comes to face the rocker bar 27 in an orientation of the shaft 30 corresponding to the locked position of the steering column. This notch 30 is thus designed to enter that of the rocker bar 27 if the latter is released by the mobile member 22.

In the other orientations of the shaft 30, the side of the rocker bar facing the shaft displays a circular concavity, to match the contour of the shaft 30.

Thus, in the superlocking configuration of the assembly, the rocker bar 27 not only releases the superlocking pin, and more generally the superlocking part which may itself be a rocker bar, but furthermore enters the shaft 30 to prevent longitudinal displacement of the latter.

Positioning of the shaft 30 so as to cover the bolt and the superlocking element and locking thereof in place by the rocker bar 27 then imparts to the shaft 30 a barrier function against access by a criminal to the bolt 8 and to its superlocking element 26.

The invention claimed is:

1. An antitheft device for the steering column of a vehicle, comprising:
    a blocking part comprising a bolt for blocking the steering column;
    a mobile member capable of controlling the blocking relative of a position of the bolt;
    an access part comprising a lock; and
    a rocker bar converting displacement of the mobile member into release of a superlocking element,
    wherein the superlocking element is situated on a side of the steering column opposite to a side where the lock is located.

2. The device as claimed in claim 1, wherein the rocker bar extends in a direction transverse to a direction of displacement of the mobile member and transverse to a direction of displacement of the superlocking element.

3. The device as claimed in claim 1, further comprising a shaft which converts rotation of the lock into a movement initiating displacement of the bolt, wherein the shaft has a lateral notch, and the pivoting rocker bar is disposed so as to pivot into the interior of the notch when the rocker bar is rocked into a position triggering superlocking.

4. The device as claimed in claim 3, wherein the notch in the shaft which converts rotation of the lock into a movement initiating displacement of the bolt is placed such that the rocker bar enters the notch only when the shaft or lock is in a position to control locking of the steering column.

5. The device as claimed in claim 3, wherein the shaft for converting rotation of the lock into a movement initiating displacement of the bolt is placed such that the bolt and the superlocking element are situated between the shaft and the steering column.

6. The device as claimed in claim 1, wherein the superlocking element is a sliding pin and the rocker bar comes into lateral contact with the sliding pin.

7. The device as claimed in claim 6, wherein the sliding pin has a slope which is oblique relative to a sliding direction of the sliding pin, wherein the oblique slope is in contact with the rocker bar.

8. The device as claimed in claim 1, wherein the mobile member is a sliding rod, a retaining element is a sliding pin, the sliding rod and the sliding pin having parallel sliding directions, and the rocker bar extends transversely to the sliding rod and the sliding pin, the rocker bar having two arms laterally facing the sliding rod and the sliding pin, respectively.

9. A vehicle, comprising:
    an antitheft device comprising:
        a blocking part comprising a bolt for blocking the steering column;
        a mobile member capable of controlling the blocking relative of a position of the bolt;
        an access part comprising a lock; and
        a rocker bar converting displacement of the mobile member into release of a superlocking element,
        wherein the superlocking element is situated on a side of the steering column opposite to a side where the lock is located.

* * * * *